UNITED STATES PATENT OFFICE.

GEORGE W. B. NEFF AND EMANUEL A. JENKINS, OF SANDY, UTAH.

COMPOSITION FOR THE MANUFACTURE OF DRY CELLS.

1,305,485.      Specification of Letters Patent.      Patented June 3, 1919.

No Drawing.      Application filed May 20, 1918. Serial No. 235,667.

*To all whom it may concern:*

Be it known that we, GEORGE W. B. NEFF and EMANUEL A. JENKINS, both citizens of the United States, residing at Sandy, in the county of Salt Lake and State of Utah, have invented new and useful Improvements in Compositions for the Manufacture of Dry Cells, of which the following is a specification.

This invention relates to a new and useful composition for the manufacture of dry cells and consists of the following ingredients of the proportions stated viz:

Carbon 20%, graphite 20%, manganese dioxid 50%, these ingredients being thoroughly mixed and reduced to a plastic state with 10% sal ammoniac diluted with water. The mixture is then placed in a suitable receptacle or container to form a dry cell, the said container including the usual zinc cup which is lined with blotting paper, the latter being also moistened with the sal ammoniac solution. The mixture is then permitted to dry. This drying of the mixture is preferably effected by the application of heat to the mixture, as this enables the composition to be dried out more thoroughly and in less time than by permitting the mixture to dry by vaporization. By applying heat to the composition to dry the same we have found that the cell is more efficient in practice than when dried in any other manner.

A solution consisting of one part sulfuric acid with thirty parts of water is then made. Three parts of the sulfuric acid solution is mixed with thirteen parts vinegar and this solution is then used to moisten the dried out mixture and the blotting paper.

This moistening solution may be applied to the dried out mixture at any time desired, as the moistening mixture is what gives long life to the cell, acting in the nature of a charge solution. As long as the mixture is in the dried out state before the application of the moistening solution thereto, no deterioration takes place in the cell and therefore the cells formed of the dried out mixture may be stored away for almost indefinite periods of time without in any way lessening their electric current producing qualities. Whenever it is desired to use one or more of the cells formed of the dried out mixture the moistening solution is applied thereto and the cells are then ready to be put into service. Of course, the moistening solution may be applied to the cells immediately upon the drying out of the mixture, if such course is desired.

The best standard cell tested burned 205 hours on the 2½ volt globe and the next best 156 hours, while a cell manufactured as above set forth burned 364 hours on a 2½ volt globe, while several burned 336 hours.

It is not desired to limit the invention to the exact proportion of the ingredients herein specified and it is also desired that it be understood that products of sulfuric acid and products of vinegar may be substituted for these solutions if desired, although the result will not be as satisfactory.

Having described the invention, what is claimed is:—

A plastic composition for dry cells, consisting of 20% carbon, 20% graphite, 50% manganese dioxid, 10% sal ammoniac, sulfuric acid three parts and thirteen parts vinegar.

In testimony whereof we affix our signatures.

GEORGE W. B. NEFF.
EMANUEL A. JENKINS.